United States Patent Office 3,443,749
Patented May 13, 1969

3,443,749
SLIDE RULE
Henry Cimetta, 323 E. 66th St.,
New York, N.Y. 10021
Filed Nov. 20, 1967, Ser. No. 684,107
Int. Cl. G06g 1/06
U.S. Cl. 235—70                5 Claims

ABSTRACT OF THE DISCLOSURE

A slide rule having two spaced parallel slide elements rigidly connected by a connecting member and slidable in two parallel channels in a slide rule body. The slide rule is particularly suitable for calculating photographic exposures indicated by an exposure meter, in which case only one connecting member is provided, connecting the slider elements at the very end of the slide rule, past the main body of the rule, the upper surface of the connecting member being flush with the upper surface of the remainder of the slide rule.

---

This invention relates to a slide rule, and more particularly, to a slide rule having at least two elongated, spaced, parallel sliding elements connected for movement in unison.

Conventional slide rules usually consist of a pair of elongated spaced parallel stationary elements between which is positioned a single sliding element. Appropriate scales are marked on the elements for performing calculations. Usually the scales are in small print in order to provide sufficient useful information on the slide rule, so that they are difficult to read and use, and it is often necessary to provide scales on both sides of the slide rule so that the slide rule will contain sufficient information to perform its functions. When the slide rule contains scales on both of its sides, it is frequently necessary to turn the slide rule back and forth during use, a procedure that is inconvenient and frequently leads to mistakes.

Accordingly, it is an object of the present invention to provide a slide rule that will accommodate substantially more than the usual quantity of information on one face of the slide rule, without the need for increasing the overall length of the slide rule or for deceasing the size of the print. In a preferred embodiment of the invention, this is accomplished by providing a pair of spaced, parallel, elongated slider elements, sliding in parallel channels in the body of the slide rule. The slider elements are connected together to slide in unison, so that when one slider element is set, the other is automatically set at the same time. This arrangement doubles the information of a given print size that can be placed on the sliding elements without resorting to the opposite face of the slide rule and without compressing the data.

The invention is particularly applicable to slide rules for use in calculating photographic exposures, and the drawings and the description will be devoted primarily to slide rules of this nature. However, slide rules according to the present invention may also be used for other purposes, i.e. for different types of calculations.

Further objects and advantages of the invention will appear from the following disclosure, taken together with the accompanying drawings in which:

FIG. 3 is a perspective view illustrating another embodiment of the invention; and FIG. 4 is an end elevation showing still another embodiment of the invention.

Figure 1:
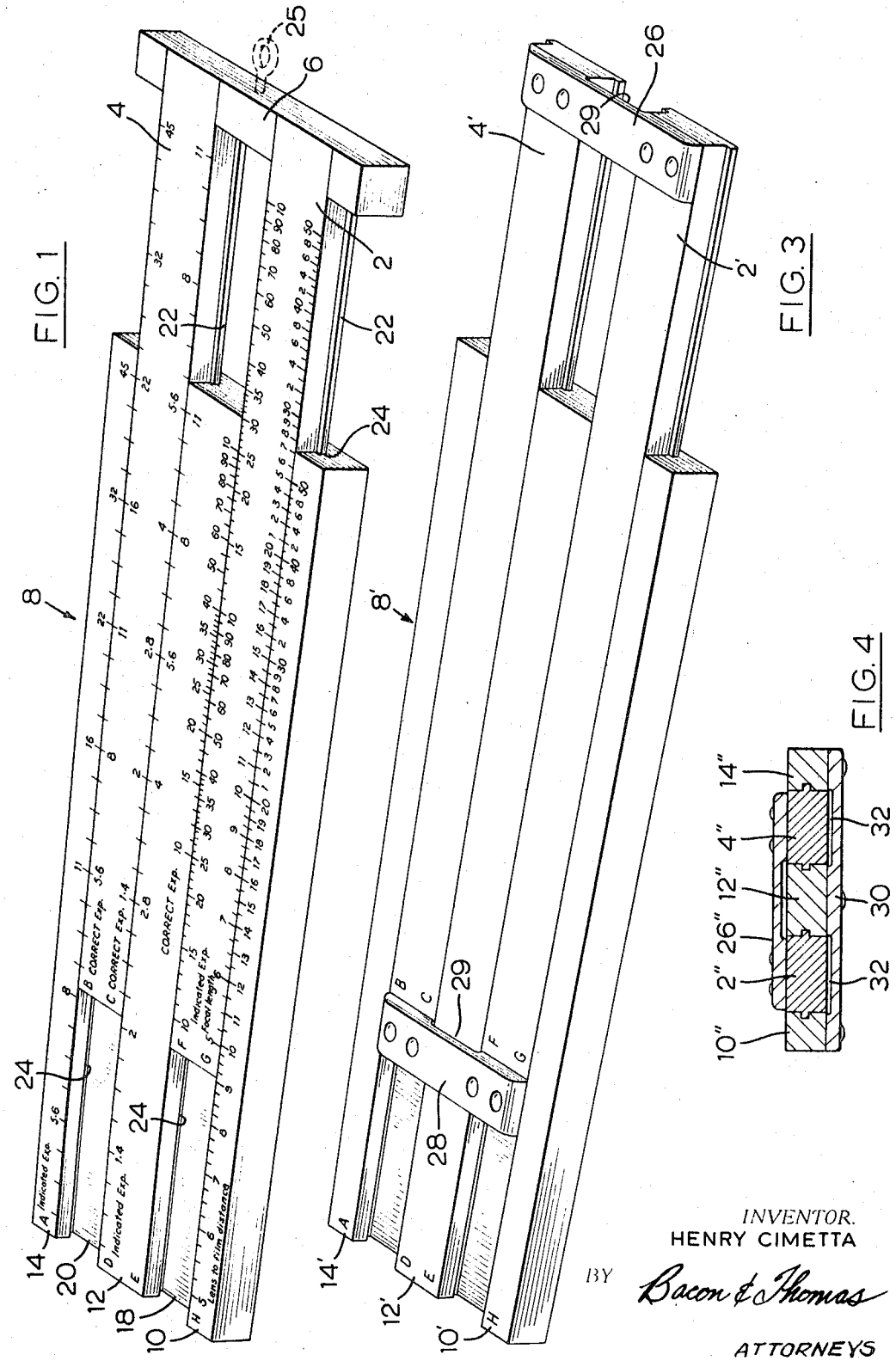
FIG. 1 is a perspective view illustrating a slide rule according to the present invention.
Figure 2:
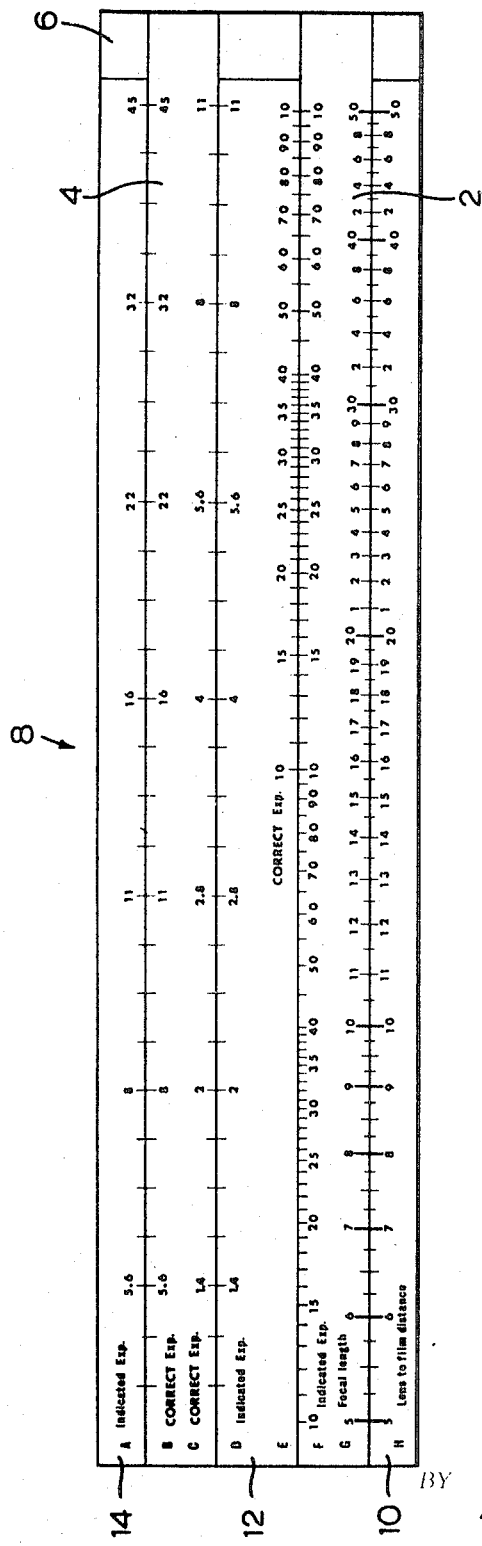
FIG. 2 is a top elevation showing the slide rule of FIGURE 1 in folded position.

Referring to FIGURES 1 and 2, the slide rule there illustrated includes a pair of slider elements 2, 4 arranged in spaced, parallel relationship and connected at their ends by an end connector 6. The slide rule also includes a main body portion generally indicated at 8 and having three spaced scale bearing body elements 10, 12 and 14. The body elements 10, 12, 14 are connected at their backs by a rear portion 16 to define a pair of channels 18, 20 therebetween to accommodate the slider elements 2, 4. The slider elements are provided with the usual ridges 22 which slide in grooves 24 at the bottom of the channels 18, 20 to prevent the slider elements from being lifted out of the channels.

The scales of the slide rule are all marked on the face exposed to view in FIGURES 1 and 2. The rear face of the slide rule is a flat sheet which may be printed with tables or other desired information. The scales illustrated are for use in calculating photographic exposures in situations where the lens to film distance in a camera being used becomes significantly greater than the lens focal length. This situation commonly occurs in bellows cameras such as those used by professional photographers, in cameras with extension tubes, and in cameras used for microscope photography and macrophotography.

Normally, in a camera, when the subject being photographed is at a long distance from the camera, the lens to film distance is substantially the same as the lens focal length. However, as the subject moves closer to the camera, and the camera is focussed, the lens to film distance becomes greater than the lens focal length (it never becomes less than the lens focal length). The farther the lens moves from the film, the more exposure is needed for the film. However, exposure meters are not usually calibrated to allow for a difference between lens to film distance and lens focal length, but instead provide readings only for a lens to film distance equal to the lens focal length. Therefore, if the difference between the lens to film distance and the lens focal length becomes significant (the difference becomes significant when the subject to lens distance becomes less than about six to eight times the lens focal length), then an incorrect film exposure will result unless the exposure meter reading is corrected. The exposure may be quickly and accurately corrected by use of the slide rule shown.

The slide rule illustrated in FIGS. 1 and 2 is shown as having eight scales, marked A to H. The content of these scales is as follows. The G scale indicates the focal length of the lens being used, in any desired units, typically inches. Most professional studio cameras have a lens having a focal length in the range between 5 and 50 inches, and in the example illustrated, scale G is marked with graduations between 5 and 50 for use with such cameras.

Scale H represents the actual lens to film distance, which will vary with the degree of expansion of the bellows if a bellows camera is used. The markings on scale H are the same as those on scale G, i.e. from 5 to 50 in the example shown, and the distance units on scales G and H will be the same (so if scale G represents inches, then scale H also represents inches).

Scales A and D are for indicated exposure, while scales B and C denote correct exposure, all in terms of aperture or f number. In other words, the exposure indicated by a light meter is read on either scale A or D, and the correct exposure (adjusted for the actual lens to film distance), is read on scale B or C.

Scales E and F are for indicated exposure and correct exposure in terms of time. These scales are an alternative to the aperture scales A to D. For example, if a light reading indicates a particular exposure time, this will be read on scale F, and the correct exposure time will be read on scale E.

In operation, assume that the focal length of the lens is 10 inches, and the actual lens to film distance (which will usually be measured with a ruler or tape measure) is 20 inches. Then, as shown in FIGURE 1, the 10 on scale G will be set opposite the 20 on scale H. This constitutes the setting of the slide rule.

Assume now that the exposure as indicated by a light meter reading is $f/16$. This will be read on scale A, and the correct exposure will then be read opposite this entry on scale B, the correct exposure in this case being $f/8$. If the indicated exposure on the meter were $f/5.6$, this would be read on scale D, and the correct exposure of $f/2.8$ would be read on scale C. The provision of two scales for indicated exposure and two scales for correct exposure allows an aperture range from approximately between $f/4$ and $f/5.6$ to $f/45$ without compressing the scales so that they are difficult to read. Other upper and lower values for the aperture scales can of course be selected if desired.

If it is desired to maintain a certain minimum aperture, e.g. to maintain a predetermined depth of field, then the exposure time may be changed instead of changing the aperture. For example, considering the slide rule setting shown in FIG. 1, assume that the reading given by an exposure meter is 4 seconds exposure at $f/16$, and it is desired to maintain the $f/16$ aperture setting. In that case, scales A and B, showing a corrected aperture reading of $f/8$, will not be used. Instead, the time reading of 4 seconds will be read on indicated exposure time scale F. Actually, the "40" entry on scale F will be used, since the units on scale F are arbitrary time units. The correct exposure time will be read on scale E as 160 or 16 seconds. In other words, in this simple example, the lens to film distance is double the lens focal length, quadrupling the light needed for proper exposure.

Although the slide rule shown in FIGS. 1 and 2 has been illustrated as having only two slider elements 2, 4, it will be apparent that more than two slider elements can be used if required to accommodate further information. For example, three or four slider elements may commonly be used.

It will be noted that the connecting member 6 of FIGS. 1 and 2 extends laterally to the edges of the slide rule, thus providing a convenient finger grip for operating the slide rule, as opposed to the conventional single slide arrangement in which the slider element must be pushed from one end to move it out of alignment with the body elements. In addition, the connecting member 6 does not obscure any of the scales on the slider elements, since it is positioned past the scale bearing parts of the slider elements, i.e. it is positioned past, and not over, the main body of the slide rule. This location of the connecting member 6 also allows for a rigid connection to the slider elements, since the connecting member grips the slider elements on three surfaces, i.e. on the lower surface and the two edge surfaces of each slider element. Glue may be used to reinforce the bond between the connecting member 6 and the slider elements, or the connecting member 6 may be formed integrally with the slider elements from a suitable material. Since the upper surface of the connecting member 6 is substantially flush with the upper surface of the remainder of the slide rule, there is no discontinuity that might distract a user's vision and impair easy use of the slide rule.

If desired, an eye or other hanger, shown in dotted lines at 25 in FIG. 1, may be used to hang the slide rule from a hook when it is not in use (assuming sufficient friction between the slider elements and the slide rule body).

Because of the construction described, the slide rule shown in FIGS. 1 and 2 will slide only to one side of the main body portion 8. This is not a disadvantage when the slide rule is used to calculate exposures as described, because the lens to film distance is never less than the lens focal length, as there is no need to move the sliders to the other side of the main body portion.

However, in other applications it may be desirable to have the slider elements slidable to both sides of the slide rule body, in which case the FIG. 3 embodiment may be used. In FIG. 3, where primed reference numerals indicated corresponding parts, the sliders 2', 4' are connected at their ends by a pair of bridge elements 26, 28. The bridge elements have their lower surfaces raised above the level of the center body element 12 to provide a clearance 29. The bridge elements 26, 28 permit movement of the slider elements in either direction relative to the main body of the slide rule while connecting the slider elements firmly together.

The bridge elements 26, 28 may be of any appropriate structural form, but will typically be in the form of steel or other metal plates riveted or bolted to the slider elements 2', 4'.

If it is desired to use the rear surface of the slide rule for calculation, the rear surfaces of the sliders 2', 4' may also be exposed, the three stationary body elements of the slide rule then being connected across their rear surfaces by other metal plates 30, as shown in FIGURE 4, where double primed reference numerals indicate parts corresponding to those of FIG. 3. Typically two metal plates 30 will be provided, both across the rear surface of the stationary body elements of the slide rule, one at each end of the slide rule. The plates 30 may be riveted or bolted to the body elements of the slide rule, with a slight clearance 32 from the slider elements 2", 4" to permit free movement of the slider elements.

If the under side of the slide rule is not to be used for calculation, then a tape measure may be incorporated therein to measure the lens to film distance, so that the one instrument can be used to perform all the calculations necessary to correct the exposure readings provided by a light meter. The body of the slide rule at one edge may be marked in inches, usually from 1 to 10 (since usually the slide rule will be 10 inches in length), and a tape measure embedded in the rear surface of the slide rule, with a retractible tape extending from one end of the slide rule as an extension of the scale marked on the edge of the slide rule.

The present invention thus provides a simple, easy to use slide rule particularly adapted for photographic calculations, and on which information is presented in a clear and uncluttered display, in a manner that will usually eliminate the necessity for turning the slide rule over during its use, thus reducing the likelihood of errors.

What I claim as my invention is:

1. A slide rule comprising
    (a) slider means having at least two straight spaced parallel elongated slider elements,
    (b) connecting means rigidly connecting said slider elements together at least at one end of said slider elements for movement of said slider elements in unison,
    (c) a main body portion having at least three elongated body elements, and means connecting said main body elements to define channels between said body elements for slidably accommodating said slider elements,
    (d) and cooperating scales at each adjacent edge of a slider element and body portion, whereby values indicated on one scale bear a predetermined relation to values read on all other scales.

2. A slide rule according to claim 1 wherein said connecting means (b) comprises a connecting member extending across said slider elements at one end of said slider elements, said connecting member extending around the sides and the undersurface of each slider element for increased rigidity of connection thereto.

3. A slide rule according to claim 1 wherein said connecting means (b) comprises a pair of bridge members, one at each end of said slider elements, said bridge members extending across the upper surface of said slider elements, the lower surface of each bridge member being raised above the upper surface of said main body portion, to permit sliding of said slide elements to either side of said main body portion.

4. A slide rule according to claim 1 wherein said body elements consist of a central body element and two edge body elements, and wherein a first one of said sliding elements has a first scale indicating lens focal length and an adjacent first body element is provided with a second cooperating scale indicating lens to film distance so that a lens to film distance indication may be set opposite a lens focal length indication to set the slide rule, the second one of said slider elements having third and fourth scales thereon indicating correct exposure data and said second and third body elements, on opposite sides of said second slider element, are provided, respectively, with fifth and sixth scales cooperating respectively with said third and fourth scales and providing indicated exposure data, so that after said slide rule is set an indicated exposure may be selected on one of said fifth and sixth scales and the correct exposure then read opposite the selected indicated exposure, on the corresponding one of said third and fourth scales.

5. A slide rule according to claim 4 wherein said first one of said sliding elements and said central body element, have adjacent time exposure scales denoting the indicated time of exposure of a film, and the correct exposure time of a film, so that the indicated exposure may be read on one of said time exposure scales after said slide rule is set, and the correct exposure time read on the other of said time exposure scales.

References Cited

UNITED STATES PATENTS

| | | | |
|---|---|---|---|
| 668,896 | 2/1901 | Wager-Smith | 235—64.7 |
| 1,426,825 | 8/1922 | Dobson | 235—70 |
| 1,602,479 | 10/1926 | Bulmer et al. | 235—70 |
| 1,864,180 | 6/1932 | Bing | 235—64.7 |
| 2,156,568 | 5/1939 | Lee | 235—70 |
| 2,207,375 | 7/1940 | Friedell | 235—64.7 |
| 2,706,081 | 4/1955 | Dowling et al. | 235—70 |

FOREIGN PATENTS

| | | |
|---|---|---|
| 8,515 | 1/1895 | Great Britain. |
| 1,145 | 12/1902 | Great Britain. |

RICHARD B. WILKINSON, *Primary Examiner.*

STANLEY A. WAL, *Assistant Examiner.*

U.S. Cl. X.R.

235—64.7